United States Patent [19]
Eilertson

[11] 3,796,398
[45] Mar. 12, 1974

[54] IN-FLIGHT AIRCRAFT RECOVERY SYSTEM

[76] Inventor: Warren H. Eilertson, 3931 L'Enfant Dr., Fort Washington, Md. 20022

[22] Filed: May 14, 1973

[21] Appl. No.: 359,744

[52] U.S. Cl. .............................................. 244/139
[51] Int. Cl. ............................................ B64d 17/00
[58] Field of Search ... 244/139, 146, 138 R, 17.1 S, 244/33

[56] References Cited
UNITED STATES PATENTS

| | | | |
|---|---|---|---|
| 1,408,873 | 3/1922 | Farina | 244/139 |
| 1,782,134 | 11/1930 | Coplen | 244/139 |
| 3,372,893 | 9/1965 | Larsen | 244/138 R |
| 3,412,963 | 9/1968 | Struble | 244/146 |
| 3,443,779 | 5/1969 | Ragallo | 244/138 R |
| 3,521,836 | 7/1970 | Struble | 244/138 R |
| 3,620,486 | 11/1971 | Chapentier | 244/146 |
| 3,622,108 | 11/1971 | Mathewson | 244/139 |

Primary Examiner—Trygve M. Blix
Assistant Examiner—Gary L. Auton
Attorney, Agent, or Firm—Brady, O'Boyle & Gates

[57] ABSTRACT

An in-flight aircraft recovery system utilizing an inflatable wing of generally rectangular planform configuration stowed in a normally collapsed condition in a compartment located on the upper portion of the fuselage in the vicinity of the plane's center of gravity. Upon deployment, the compartment's cover is ejected and a first parawing type pilot chute lifts a container including the inflatable wing from the compartment and above the tail section of the aircraft. The first pilot chute is jettisoned along with the container after the suspension lines are fully extracted and a second pilot chute of a similar parawing configuration attached to the wing is deployed which positions the inflatable wing above the aircraft with the wing then being inflated by means of a turbine driven compressor mounted on the airfoil surface. The inflatable wing when inflated comprises a rectangular wing including control surfaces in the form of controlled flaps at the wing trailing edge. The wing is connected to the airplane by means of a plurality of suspension lines which are attached to respective rotatable reels. The reels are further controlled for providing selective unreeling and braking of the lines during wing deployment and for subsequently altering not only the angle of attack of the inflated wing, but also the flaps so that the inflated wing flys the aircraft to a predetermined destination either by means of remote pilot control or beacon ground control.

14 Claims, 20 Drawing Figures

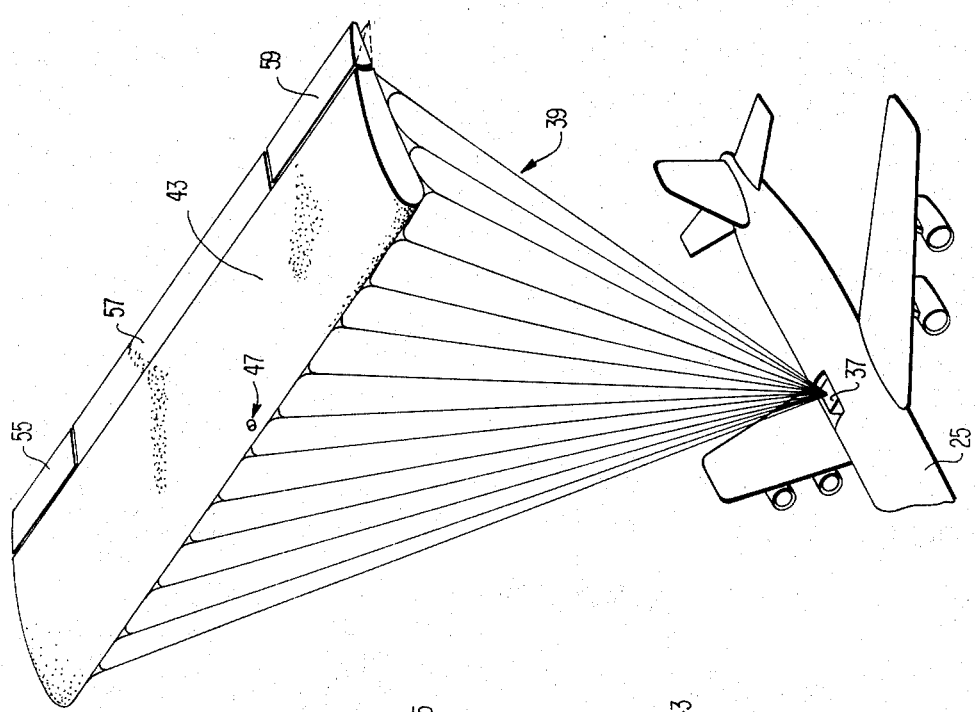
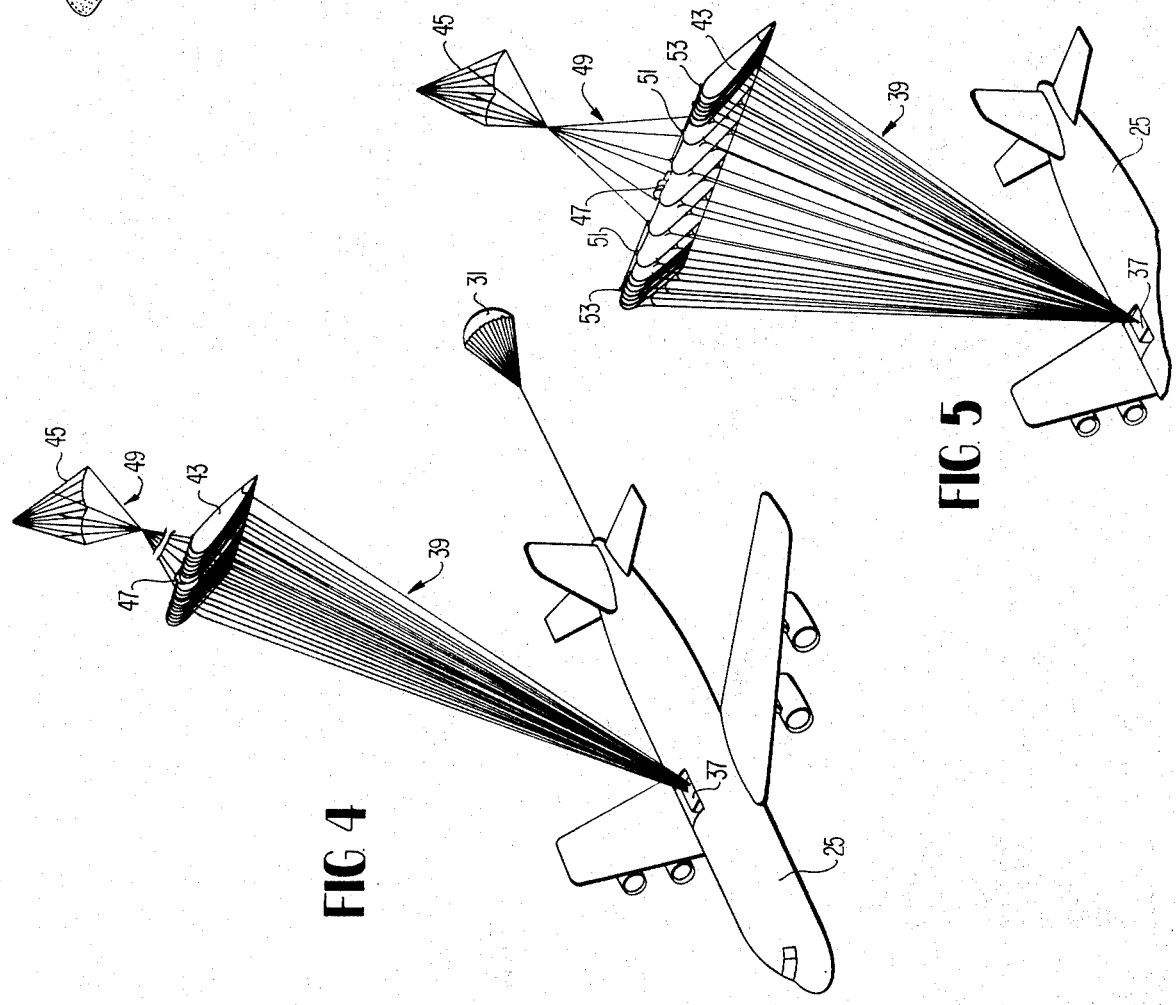

3,796,398

IN-FLIGHT AIRCRAFT RECOVERY SYSTEM

BACKGROUND OF THE INVENTION

1. Field of the Invention

The present invention is directed generally to emergency systems for safely landing disabled aircraft and more particularly to a system utilizing an inflatable wing having control surfaces including means whereby both the wing and the control surfaces can be selectively controlled for flying the wing with the disabled aircraft suspended therefrom to a predetermined landing site.

2. Description of the Prior Art

Various systems are known by those skilled in the art for recovering disabled aircraft. For example, U.S. Pat. No. 3,622,108 issued to George A. Matthewson, discloses a parachute and gas filled balloon which is deployed from a stowage compartment to safely lower the aircraft to the ground under emergency conditions such as may be caused by power failure during flight. Still earlier systems included the deployment of supplemental wing surfaces. One configuration even discloses an inflatable bag, part of which appears to include a portion of the wing. The latter teaching is taught in U.S. Pat. No. 1,765,972, issued to K. Fechter. Additionally, the prior art is replete with many types of flexible and inflatable wing structures, typical examples of which are disclosed in the following patents: U.S. Pat. No. 3,521,836, A.D. Struble, Jr.; U.S. Pat. No. 3,481,569, J.C. Bell; U.S. Pat. No. 3,480,238, D.T. Barish; and U.S. Pat. No. 3,443,779, F.M. Rogallo, et al. While these systems apparently operate as intended, it is the object of the present invention to provide still a further improvement over the various prior art systems presently known.

SUMMARY

Briefly, the subject invention is directed to an improved emergency recovery system for disabled aircraft comprising an inflatable rectangular wing having flap type control surfaces. The wing is stowed in a collapsed condition in a compartment in the aircraft. When an emergency condition presents itself such as when the aircraft becomes disabled and incapable of flight to a safe landing site under its own power, the collapsed wing is deployed first by a first parawing pilot chute for removing the wing from the compartment and away from the tail section of the aircraft. The first pilot chute is dropped and a turbine driven compressor mounted on the wing inflates the wing, during which time a second parawing pilot chute orients the partially inflated wing in a proper attitude to provide a lifting airfoil even during inflation. The wing is attached to a plurality of suspension lines arranged in sets. The sets of lines are fed from rotatable reels located at the aircraft for controlling not only the angle of attack of the wing, but the control surfaces as well. A guidance and control unit controls the reels in response to flight control signals coupled thereto either from the pilot in or remote from the aircraft, or a remote ground station.

BRIEF DESCRIPTION OF THE DRAWINGS

FIG. 4 is a perspective view of the aircraft during yet a later phase of deployment wherein the inflatable wing begins to become inflated;

FIG. 5 is a perspective view of the aircraft during a still later phase of deployment wherein the inflatable wing is partially inflated;

FIG. 6 is a perspective view of the aircraft with the rectangular inflatable wing fully inflated above the aircraft;

DESCRIPTION OF THE PREFERRED EMBODIMENTS

Figure 1:
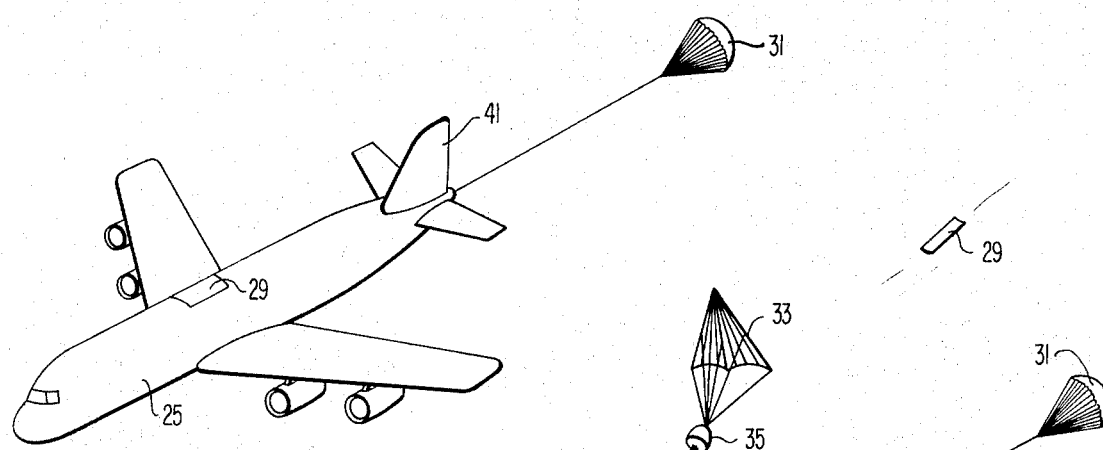
FIG. 1 is a perspective view of an aircraft having a drag chute deployed for decelerating the aircraft upon the occurrence of an in-flight emergency situation requiring utilization of the subject invention.

Referring now to the drawings, and more particularly to FIGS. 1 through 6, inclusive, there is disclosed broadly the means contemplated for practicing the subject invention and its intended mode of operation. Reference numeral 25 designates an aircraft such as a modern jet type airplane. The configuration of this aircraft is not meant to be considered in a limiting sense, since it is meant to include any type of aircraft including helicopters, both engine and jet type aircraft, and even personnel recovery and inclusive of private, commercial, and military equipment. For the sake of illustration, however, a commercial jet type aircraft will be considered as being shown in the figures, it being understood that suitable modifications would be readily known to those skilled in the art for use with military and private aircraft.

Figure 2:
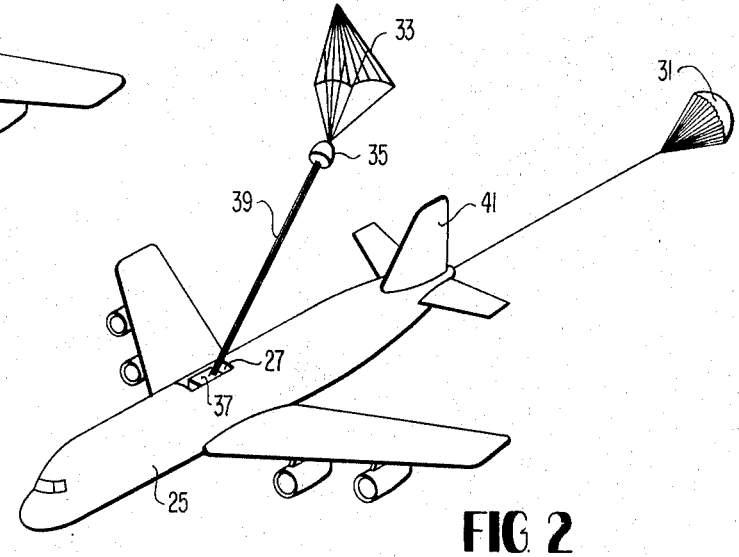
FIG. 2 is a perspective view of the aircraft further illustrating the initial stage of deployment of an inflatable wing contained in a bag type container stowed within the aircraft.
Figure 3:
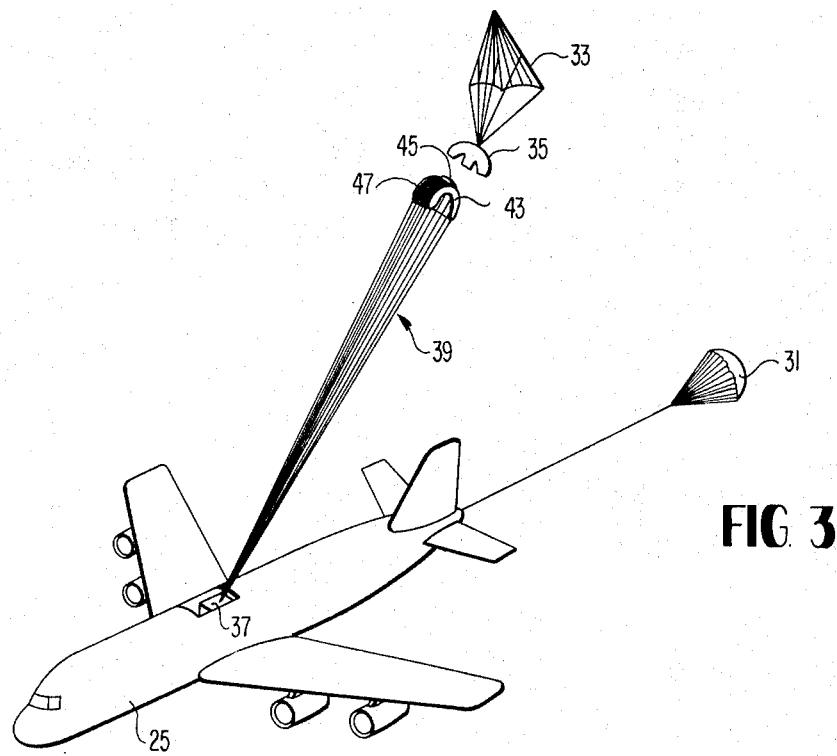
FIG. 3 is a perspective view of the aircraft during a later phase of deployment wherein the stowage container is removed by a first pilot chute.

The aircraft includes a compartment 27 shown in FIG. 2 having a cover 29 which is adapted to be blown off by suitable pyrotechnic means, not shown, when an emergency situation arises. The rear portion of the aircraft 25 includes a compartment, not shown, for the storage of a drag chute 31 which is deployed by suitable pyrotechnic means during the initial phase of activating the recovery system. The drag chute 31 is adapted to slow the air speed of the aircraft 25 to a relatively safe speed, e.g. 150-200 knots for operation of the system since large lifting surfaces to which the subject invention pertains cannot tolerate large shock forces with resulting dynamic pressures in the region of 100 pounds per square foot or more. Furthermore, the drag chute 31 acts to provide a stabilizing force in the event the aircraft 25 is out of control at the time that the recovery sequence is initiated.

After the aircraft 25 has slowed to the required deployment speed, the hatch cover 29 is blown off as shown in FIG. 2 and a first pilot chute 33 in the form of a parawing or other lifting body is ejected from the compartment 27. The pilot chute 33 is attached to a bag type container 35 which houses an inflatable wing that is attached to a reel assembly shown generally by reference numeral 37. A plurality of suspension lines generally designated by reference numeral 39 feed from the reel assembly 37 and terminate at the inflatable wing. The pilot chute 33 is configured in a lifting configuration in order to provide lift for the container 35 to clear the tail section 41 of the aircraft during deployment.

The suspension lines 39 are reeled off of the reel assembly 37 until they are fully extracted, during which controlled braking is effected, in order to eliminate high snatch forces from being built up. The pilot chute 33 then is used to pull the container 35 off from the collapsed inflatable wing 43 shown in FIG. 3 after pyrotechnic devices open the container. Referring now to FIG. 4, a second pilot chute attached to the upper surface of the collapsed wing 43 is deployed, which pilot chute is also of a parawing or some such lifting configuration which causes the collapsed wing 43 to rise towards the vertical position. The collapsed wing 43 also includes a gas turbine-rotary compressor arrangement or other such inflating device shown generally by reference numeral 47 which is simultaneously activated when the container 35 is removed, and which acts to inflate the collapsed wing 43. The turbine-compressor unit 47 is located on the forward section of the upper surface of the collapsed wing and is adapted to be situated intermediate its extended span.

Referring now to FIG. 5, the collapsed wing 43 comprises an airfoil structure configured either in an Airmat or aircell wing design and is adapted to be inflated first in the center sections and then towards the outer sections by means of the second pilot chute 45, making use of the drag force of the pilot chute. This is done by routing the suspension lines 49 through rings 51 on the top of the wing and which are firmly attached to the outermost rings 53. The drag force of the second pilot chute 45 and the suspension line arrangement thereby acts to restrain the lateral spread of the wing 43 during inflation. As noted above, the second pilot chute 45 additionally acts to raise the wing toward the vertical during inflation; however, it should be pointed out that the centermost portion of the wing 43 which becomes inflated immediately provides a lifting effect even before the wing is fully inflated. Studies have indicated that an increase in altitude of several hundred feet occurs when this deployment technique is used. This is a significant advantage where utilization of the system is required near the ground either during take-off or landing since this is a major cause of loss of life and/or aircraft. The opening rate of the wing 43 is thus proportional to the drag force of the pilot chute 45 and the inflation speed of the system. As the aircraft slows down the drag force on the pilot chute is reduced, allowing the wing to spread further. A reasonable time of inflation is in the order of 10-15 seconds with an additional two second time interval for extraction from the aircraft. The second pilot chute is then separated from the wing using pyrotechnic device cutters or other devices.

FIG. 6 is illustrative of the wing 43 being fully inflated and configured preferably as but not limited to an air-foil of a rectangular planform having an aspect ratio (AR) in the order of 3.0. Additionally, the wing includes three flap sections 55, 57 and 59 which together extend across the entire rear or trailing edge of the wing. The flaps 55, 57 and 59 comprise roughly 20 percent of the chord length (width) of the wing 43. As will be explained subsequently, the wing 43 is adapted to have its angle of attack varied, thereby providing lift modulation by means of actuation of certain suspension lines 39 by means of the reel assembly 37. One set of lines is connected to the flaps 55, 57 and 59 to provide additional flight control so that not only steering, but also a flaring capability at touchdown is attained. The inflatable wing possesses a lift capability at low drag levels which results in increased ranging capability over existing parachute recovery systems. The inflation pressure is additionally controlled to allow for the required wing loadings such as 20 pounds per square feet or more.

The planform area or size (S) of the wing is based upon the weight (W) of the aircraft in question, and the acceptable wing loading (L), providing the expression, $$S = (W/L), \text{ ft.}^2. \tag{1}$$

The wing span (B) can be expressed as:

$$B = \sqrt{AR \times S} \tag{2}$$

and the wing chord (C) can be expressed as:

$$C = B/AR \tag{3}$$

With a wing configuration as disclosed, it can be shown that the lift to drag ration ($L/D_{max}$) for an angle of attack $\alpha = 0°$ is in the order of 10, reaching a maximum of 13 for an angle of attack of $\alpha = 4°$. Taking into account the drag introduced by the suspension lines, the ranging capability of the subject invention is still in the order of two to three times the capability of current gliding parachute recovery systems which have a lift to drag ratio in the order of 3.

Figure 7:
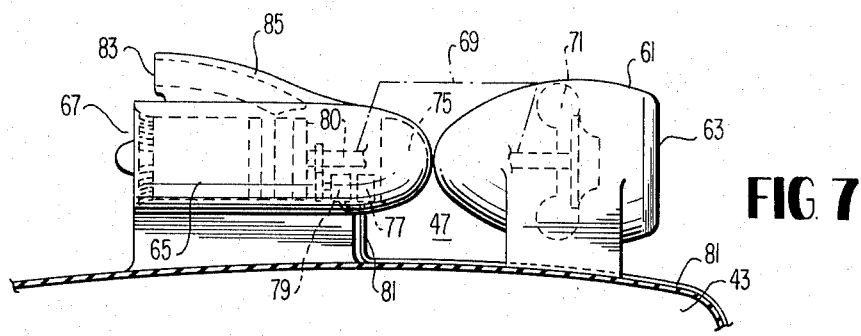
FIG. 7 is a partial side elevational view of the inflated wing including a tandem gas turbine and rotary compressor combination located on the upper portion of the wing surface.
Figure 8:
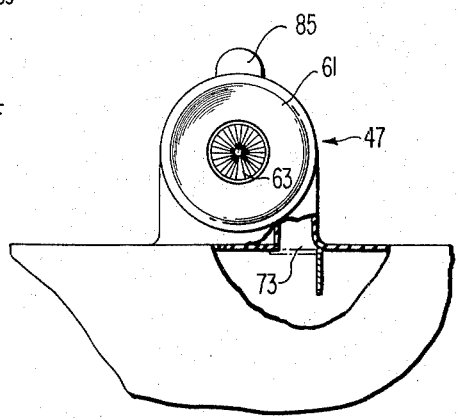
FIG. 8 is a partial front elevation view of the turbine compressor combination.

While it is possible to inflate the wing 43 by means of pressurized containers or "bottles" of a suitable gas, the present invention preferably utilizes a gas turbine driven rotary compressor, inasmuch as considerable weight would be required for gas "bottles" and the problem of providing additional make-up air is substantially increased. Accordingly, FIGS. 7 and 8 disclose a tandem turbine-compressor configuration which includes a rotary air compressor 61 having its inlet 63 pointing forwardly to receive air as the wing 43 moves in the forward direction, and a self-contained gas driven turbine 65 located behind the compressor 61 in order to reduce drag. The turbine 65 is oriented such that its inlet 67 faces the rear edge of the wing 43. A typical example of a turbine adapted for the instant use is a Garrett/Airesearch JFS100 Jet Fuel Starter Gas Turbine, which produces 80shp for relatively short periods of time and weighs approximately 80 pounds. Its start up time providing maximum inflation is on the order of 5.0 seconds, and can easily be modified to provide a 15 to 20 minute operating time required for system operation. The turbine is adapted to drive the compressor 61 for example by a connection link shown schematically by reference number 69 which could be in the form of a chain drive connecting respective shafts, and the impeller 71 of the compressor receives the incoming air at the inlet 63 and forces it into the wing's interior by means of the conduit 73.

The gas turbine 65 includes a fuel tank 75 in the rear portion thereof, as well as an electrical generator 77 and starter 79 coupled to the turbine shaft 80 by a gear arrangement. Both the generator 77 and starter 79 are electrically coupled back to guidance and control circuitry shown in FIG. 20 by means of an electric cable 81. The starter 79 is adapted to receive an initiation signal upon wing deployment for activating the gas turbine while the generator 77 feeds electrical power back to the electrical circuitry in order to selectively power the reel assembly 37. Although the turbine-compressor combination 47 could be mounted elsewhere on the wing 43, it is shown preferably located on the top of the wing near the leading edge. The hot exhaust gases from the gas turbine is deflected upward away from the wing surface by means of an exhaust conduit 83 contained in a rigid exhaust fairing 85.

Figure 9:
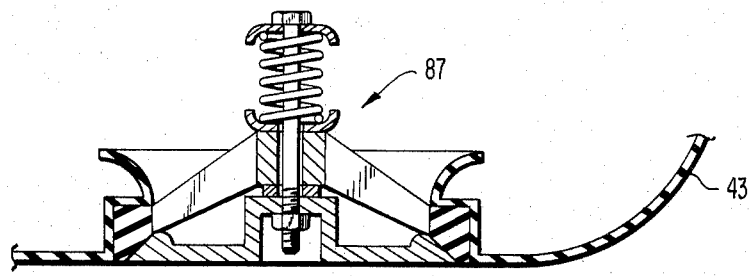
FIG. 9 is a cross sectional view of a pressure relief valve incorporated in the wing.

Inasmuch as the compressor 61 is driven continuously, once the wing 43 is inflated, it becomes desirable to include one or more spring biased relief valves 87 located in the lower surface of the wing 43 as shown in FIG. 9. Such a relief valve is adapted to open at a predetermined pressure, such as 4psi, thereby acting to maintain the internal pressure of the wing at a substantial constant value after inflation. For inflation pressure in the order of 4psi, an inflation time in the order of 10 seconds is realizable.

Figure 10:
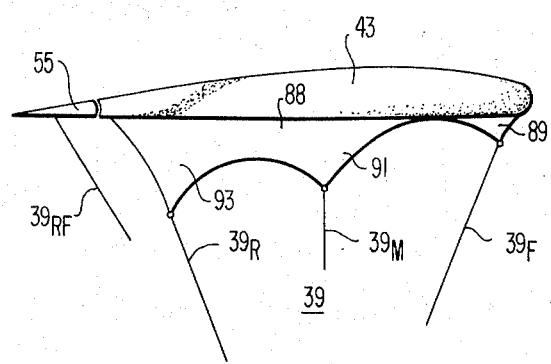
FIG. 10 is a side elevational view of the airfoil including catenaries having suspension lines attached thereto as well as the flap control lines.

Referring now to FIG. 10, there is disclosed the manner in which the plurality of suspension lines 39 coming from the reel assembly 37 are attached to the underside of the wing 43. It is by means of a catenary 88, the suspension lines 39 comprise four sets of lines $39_F$, $39_M$, $39_R$, and $39_{RF}$. The first set $39_F$ is attached to the front underportion of the wing 43 by means of the catenary section 89. The second set of lines $39_M$ is attached to the middle portion of the underside of the wing 43 by means of the catenary section 91 while the third set of lines $39_R$ is attached to the rear portion of the wing by means of the catenary section 93. The catenary sections are adapted to provide sufficient area aft of the wing's center of pressure to provide directional stability in gliding flight. When desirable, the catenary areas can be increased at the wing tip to provide additional lift by means of the end plating effect. The final set of suspension lines $39_{RF}$ comprise three or more lines which respectively connect to the rear control flaps 55, 57 and 59.

Figure 11:
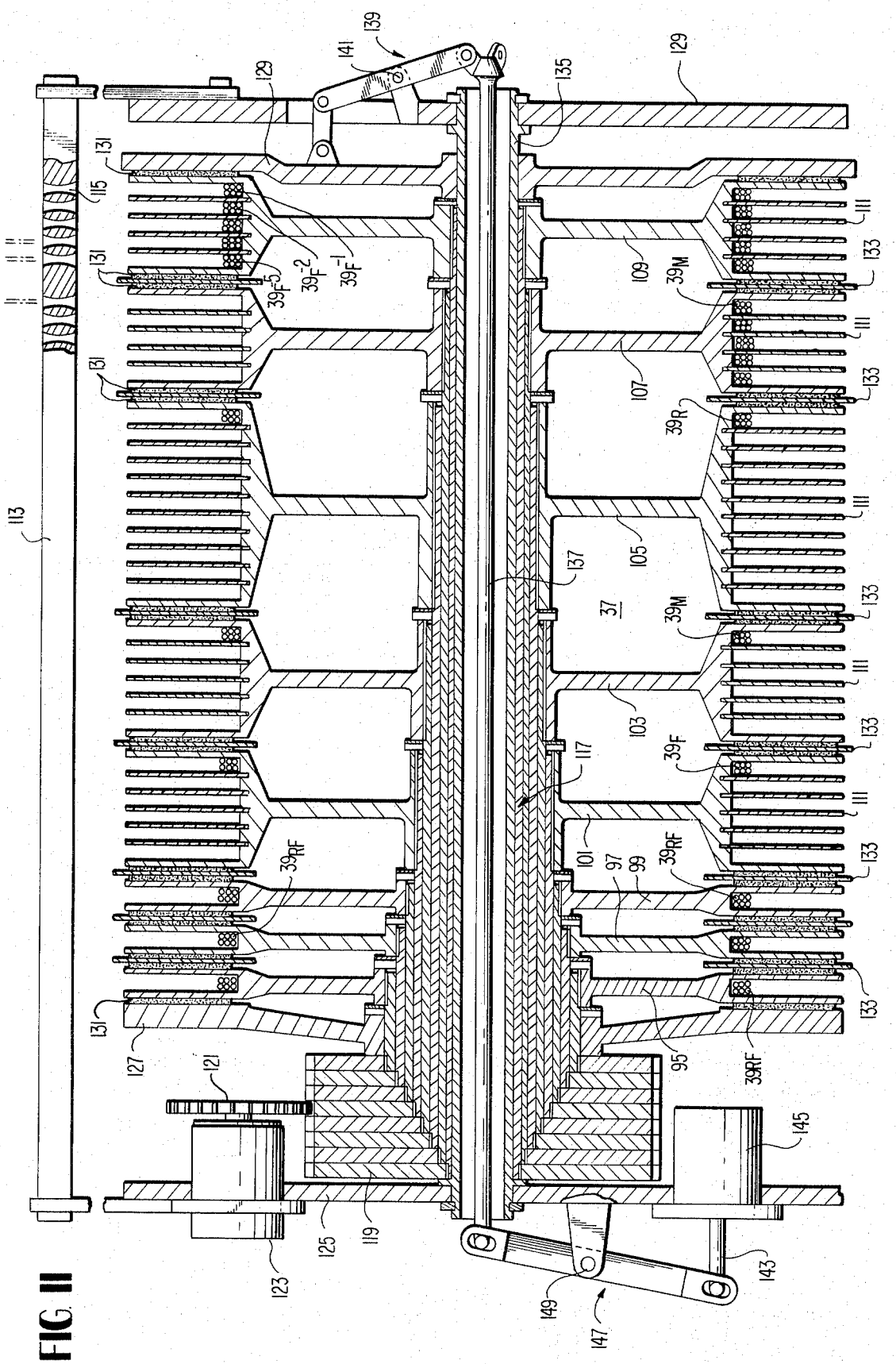
FIG. 11 is a cross-sectional view of an illustrative suspension line reel assembly including the brake mechanism therefor for controlling the lines connected to the inflatable wing.

The four sets of suspension lines $39_F$, $39_M$, $39_R$ and $39_{RF}$ are adapted to feed to and from the reel assembly 37 an illustrative example of which is shown in detail in FIG. 11. The assembly as shown is comprised of eight reels 95, 97, . . . 107 and 109 coaxially mounted side by side, being independently rotatable by means of concentric shafts which are individually driven. Assume for the sake of illustration that the three sets of suspension lines $39_F$, $39_M$ and $39_R$ include eleven lines each, while the set of suspension lines $39_{RF}$ are comprised of three lines amounting to a total of 36 lines. The first three smaller reels 95, 97 and 99 contain the three flap control suspension lines $39_{Rf}$ respectively. Adjacent to the reel 99 is a first larger reel 101 which is adapted to contain six of the front suspension lines $39_F$, while a second larger reel 103 adjacent the reel 101 is utilized for six of the middle suspension lines $39_M$. The largest reel 105 is adapted to contain all eleven of the rear suspension lines $39_R$. The two outer reels 107 and 109 include the remaining five middle lines $39_M$ and the remaining five front suspension lines $39_F$, respectively. Each of the reels 101 . . . 109 containing multiple lines include spacers 111 to keep the respective lines separated from one another. Additionally, one or more cable guides 113 span the reels and include a plurality of passages 115, one for each of the respective lines 39. Each of the reels 95, 97, . . . 109 are attached to a respective drive shaft of a plurality of concentric shafts designated by reference numeral 117. Each of the shafts has a gear 119 attached to one end thereof which meshes with a respective second gear 121 which is adapted to be rotated by a separate motor 123. The motor 123 may be any type of motor means which is adapted to be externally controlled for selective rotation.

Figure 12:
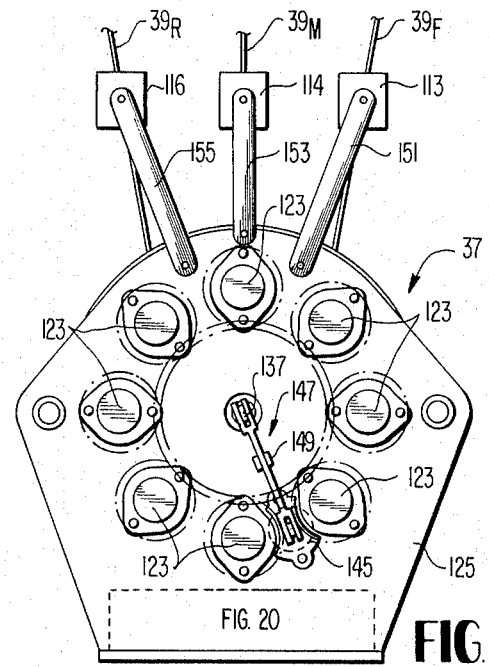
FIG. 12 is one end view of the reel assembly shown in FIG. 11.

Referring now briefly to FIG. 12, eight drive motors 123 are arranged in circular fashion on an end plate 125 for driving a respective reel 95 . . . 109 through its respective gear end shaft combination. The motors 123 may be, for example, electric motors of the selsyn type which is adapted to be operated from electrical signals remotely applied thereto from external circuits so that each of the reels can be individually rotated in one direction or another, depending upon the flying maneuver required of the wing 43, since by selective reeling of the four sets of suspension lines $39_F$, $39_M$, $39_R$ and $39_{RF}$, it becomes possible to change the angle of attack of the wing 43 and/or cause the flaps 55, 57, and 59 to be deflected downwardly.

Figure 13:
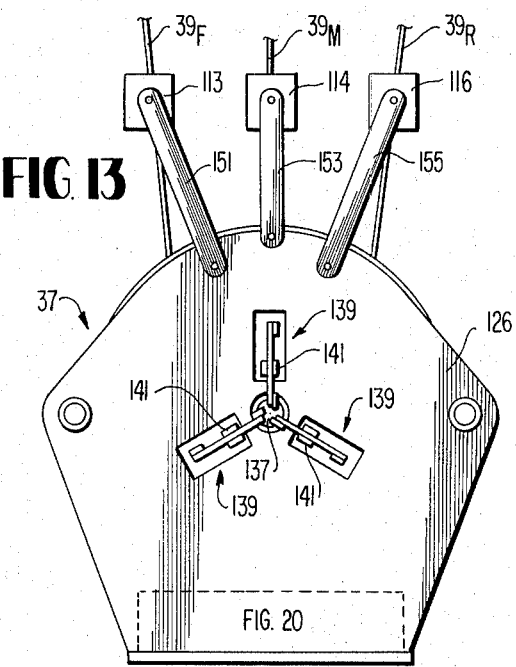
FIG. 13 is the other end view of the reel assembly.

The reels 95, 97, . . . 107 and 109 are simultaneously braked during extraction of the respective lines to prevent high snatch or shock forces from being exerted on the wing 43 as it deploys. The braking force is provided in the configuration shown in FIG. 11 by means of a pair of pressure plates 127 and 129 located at opposite ends of the reel arrangement. Brake lining pads 131 are affixed to the outer surfaces of each of the reels 95 . . . 109 and stationary braking plates 133 are located between adjacent reels. Whereas one end pressure plate 127 is fixed, the opposite pressure plate 129 is slidably mounted on the center shaft 135. An axle rod 137 extends through the innermost shaft 135 and is coupled at one end to the pressure plate 129 by means of a linkage 139 which includes a pivot 141. The opposite end of the axle rod 137 is coupled to the shaft 143 of an electrical solenoid 145 by means of the linkage 147 which includes a pivot 149. Thus when braking of the reels is desired, the solenoid 145 is electrically actuated, forcing the solenoid shaft 143 outwardly as shown in FIG. 12. This motion is coupled to the axle 137 through the linkage 147. The urging of the pressure plate 129 inwardly causes frictional force to be built up in the brake lining pads 131, causing the desired braking. Although FIG. 11 shows but one linkage 139 coupling the pressure plate 129, reference to FIG. 13 illustrates three identical linkages 139 being connected to the axle rod 137. The latter provides a more uniform braking force being applied to the plate 129.

Figure 14:
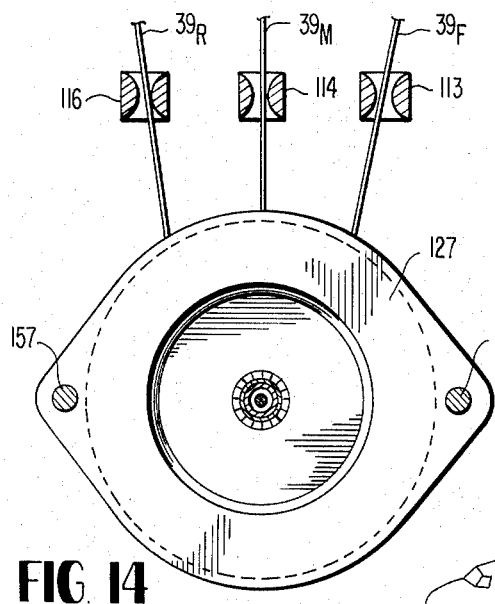
FIG. 14 is a partial cutaway view of the reel assembly and being further illustrative of the cable guide and one of the brake pressure plates.

FIGS. 12, 13 and 14 additionally disclose three suspension line guides 113, 114 and 116 for providing a balanced feed from the reels so that for example lines $39_F$ feed through guide 113, the middle set of suspension lines $39_M$ feed through guide 114, while the rear suspension lines $39_R$ and the flap lines $39_{RF}$ feed through the guide 116. Moreover, the guides 113, 114 and 116 are pivotally attached to the end plates 125 and 126 shown in FIG. 11, by means of the respective bracket members 151, 153 and 155.

FIG. 14 is disclosed for the purpose of illustrating an end view of the braking plate 127 which is coupled to the opposite braking plate 129, not shown, by means of the support rods 157 and 159. The stationary braking plates 133 shown in FIG. 11 are also mounted on the support rods 157 and 159. Additionally, cross sections of the line guides 113, 114, and 116 are shown for purposes of illustrating the curved surfaces interiorally thereof for the passage of the respective suspension lines.

Figure 15:
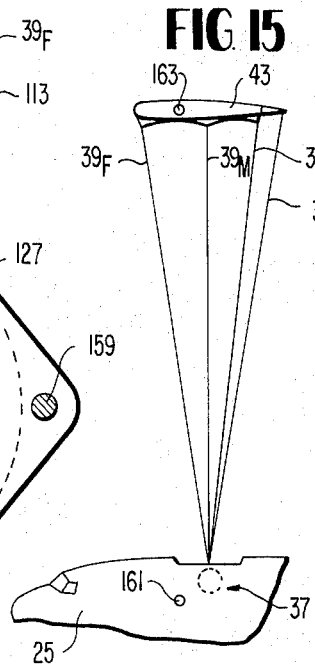
FIG. 15 is a partial side elevational view of the aircraft, being illustrative of the relationship of the inflatable wing and reel assembly in relation to the aircraft center of gravity.
Figure 16:
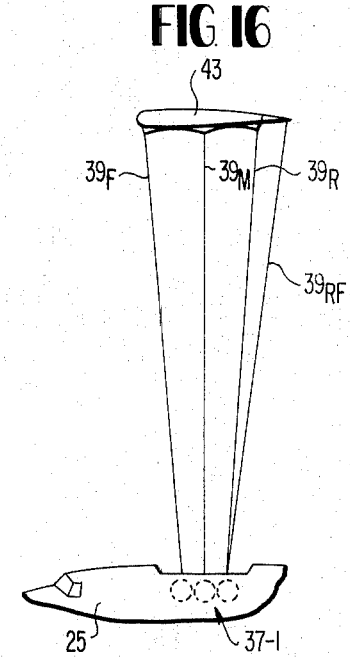
FIG. 16 is a partial side elevational view illustrating the relationship of the wing in connection with a second configuration of the reel assembly.
Figure 17:
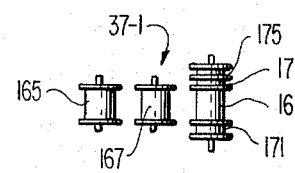
FIG. 17 is a diagram illustrative of the arrangement of the reels shown in FIG. 16.

Referring now to FIG. 15, it is the purpose of this illustration to note that the position of the single axis reel configuration 37 shown in detail in FIGS. 12 through 15, is located in the compartment 27, which is selectively positioned relative to the aircraft's center of gravity 161 such that when the wing 43 is deployed and inflated, its center of pressure 163 is substantially in line with the aircraft's center of gravity 161. Where the aircraft's storage compartment 27 is limited in the lateral dimension, or where the center of gravity shift of the aircraft is large, such as when a large amount of fuel is consumed or other dynamic weight distribution takes place, tandem arrangements may be resorted to such as shown in FIGS. 16 through 19. FIGS. 16 and 17 illustrate one embodiment of a tandem configuration wherein a first reel 165 is adapted to contain all of the front lines $39_F$, a second reel 167 contains all of the middle support lines $39_M$ and a third reel 169 contains all of the rear lines $39_R$. On the same axis with the reel 169 are three smaller reels 171, 173 and 175 which respectively contain the three flap control lines $39_{RF}$.

Figure 18:
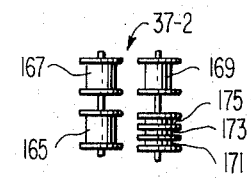
FIGS. 18 and 19 are third and fourth embodiments of reel configurations which are adaptable for use in connection with the subject invention.
Figure 19:
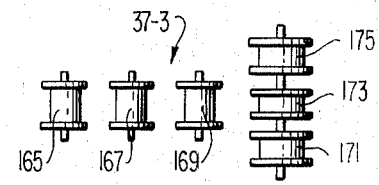

Moreover, when desirable, the entire configuration of reels may be adapted to move in unison forwardly or rearwardly in order to adjust for any center of gravity change of the aircraft. FIG. 18 merely puts reels 165 and 167 on a common shaft while redistributing the reels 169, 171, 173 and 175 on common shaft behind the other shaft. FIG. 19 is adapted to illustrate a further modification of the reel arrangement wherein the three reels for the flap lines $39_{RF}$ are on a common shaft but with the reel 169 for the rear suspension lines $39_R$ occupying a separate shaft as do the reels 165 and 167. What isn't shown and described is the resultant modification of the control motors and the braking arrangements for the reels; however, it is submitted that such modifications are well within the scope of those skilled in the art.

What has been shown and described thus far is an illustrative embodiment of the mechanical details of the subject invention. Now attention is directed to FIG. 20 which discloses in block diagrammatic form the control circuitry utilized for deploying the inflatable wing 43 and providing guidance signals for remotely controlling the wing in flight in order to deliver the aircraft 25 to a predetermined site including touchdown or landing of the aircraft. Considering first the deployment circuit, in the event that the aircraft encounters an emergency situation where it becomes disabled and incapable of sustained flight on its own, the pilot either manually or by some other means actuates a deployment switch 177. This switch 177 couples to means 179 which fires suitable pyrotechnics for deploying the drag chute 31 shown in FIG. 1. Suitable speed sensing means 181 is interlocked with the drag chute deployment circuitry 179 which senses the safe speed for the deployment of the wing 43. When such speed is attained, circuit means 183 receives a signal from means 181 activating suitable pyrotechnics or other means for blowing off the hatch cover 29 shown in FIG. 2. Next means 185 is activated to release the combined first pilot chute 33 and the wing container 35 shown in FIGS. 2 and 3. Following the release of the first pilot chute 33, circuit means 187 adapted to activate the solenoid 145 shown in FIG. 12 is operated for providing the necessary braking action of the unreeling of the lines 39. Following this a signal is applied to a circuit 189 which activates the switch 79 shown in FIG. 7 via cable 81 which starts the gas turbine for inflating the wing. Following partial wing inflation, circuit means 191 activates suitable pyrotechnics or other means for releasing the drag chute 31.

Figure 20:
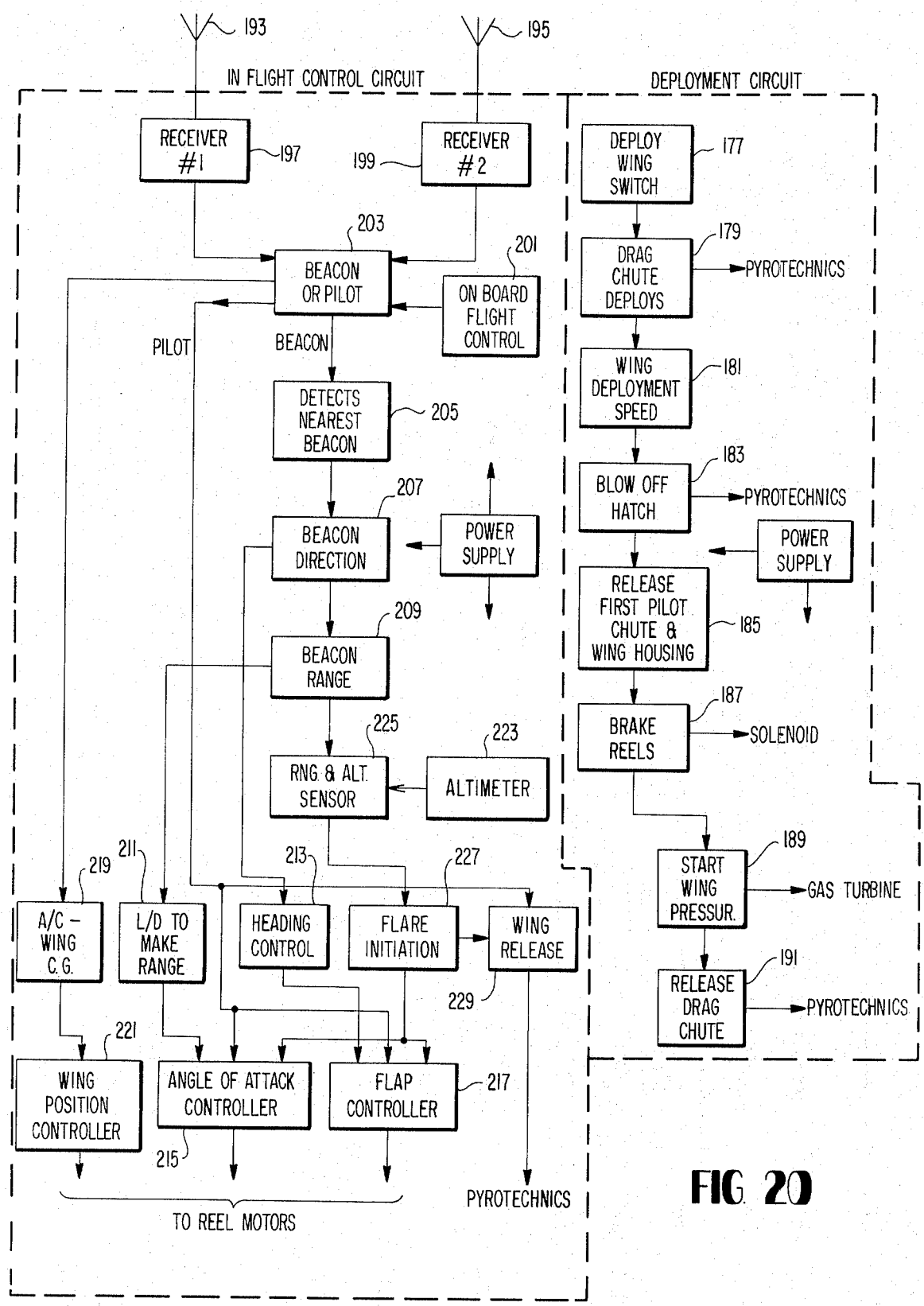
FIG. 20 is an electrical block diagram of the control circuitry utilized in connection with the subject invention.

After the inflatable wing 43 has been deployed and fully inflated, in-flight guidance and control circuitry further shown in FIG. 20 is located in the aircraft compartment 27 e.g. under the reel assembly. The guidance and control circuitry is adapted to receive flight control signals either from a remote beacon located at a desirable landing site for the disabled aircraft, or may comprise pilot operated control signals. Where for example the disabled aircraft comprises a military type aircraft wherein the pilot elects not to eject from the cockpit in the event of aircraft disability or the aircraft comprises commercial equipment, he would have a suitable transmitting device located locally for controlling the wing 43 through the reels.

The circuitry shown in FIG. 20 includes a pair of antennas 193 and 195 as well as a pair of respective receivers 197 and 199. Such a dual antenna receiver configuration is typical of a beacon flight directional control or VOR system. Secondly, onboard flight control interconnect circuitry 201 is adapted to receive control signals from the pilot cockpit or flight deck which might be required for commercial aircraft and the like where passengers are involved. A logic circuitry 203 next notes which type of control signals are being supplied. Considering first that it is desirable in a first operating mode to home in on a beacon circuitry 205 detects the maximum signal strength of the nearest beacon whereupon circuitry 207 and 209 determines direction and range of the beacon. This information is coupled next to computer circuitry 211 and 213 which computes the required lift to drag (L/D) ratio of the wing 43 in order to fly to the range indicated for the nearest beacon. This information is fed into circuitry 215 for controlling selective motors for the reels 101, 103, 105, 107 and 109 thereby changing the angle of attack of the wing 43. The heading control circuitry 213 feeds into circuitry 217 which is adapted to control the reels 95, 97 and 99 for controlling flaps and thereby provide a heading control of the wing 43. Additionally, when desirable, the logic circuitry 203 may feed into circuitry 219 which determines the relative position of the aircraft and wing's center of gravity. The information generated by circuitry 219 feeds into controller circuitry 221 which is adapted to provide further control of the reel motors to shift the position of the wing 43 in accordance with the change in the center of gravity of the aircraft. An altimeter 223 and the range determining circuitry 209 feeds into sensor circuitry which provides information to a circuit 227 which effects initiation of a flareout procedure by feeding suitable signals through the angle of attack control at 215 and the flap controller 217. The circuitry 227 also feeds into a wing release circuit 229 which upon touchdown initiates suitable pyrotechnics or other means for releasing the cables from the drums.

In the event that pilot control is desired, control signals are transmitted to the logic circuitry 203 which then couples these signals to the angle of attack control circuitry 215, the flap control circuitry 217, and the wing release circuitry 229 whereby suitable control by the pilot can be maintained.

As the disabled aircraft approaches either the beacon or the landing site chosen by the pilot, the wind speed and direction is noted and the heading is corrected to allow a landing into the wind. The range and altitude sensor 225 notes the required altitude for the flare maneuver just prior to touchdown whereupon the flap controller circuitry 217 is started by the flare initiation circuitry 227. The flaps 55, 57 and 59 are deployed and the angle of attack controller changes the wing to provide maximum lift at touchdown.

What has been shown and described, therefore, is an improved in-flight aircraft recovery system utilizing an inflatable wing canopy with suspension lines attached to a plurality of reels having selective control and braking for varying the inflated wing's angle of attack for controlling range and a flared landing maneuver. Flaps are also included in the inflatable wing with respective reels and suspension lines attached thereto for providing not only additional flight control, but also aiding the flared landing maneuver. Guidance and control means are also included for operating the reels so that the disabled aircraft can be flown to a predetermined destination.

What is claimed is:
1. An in-flight recovery system, for disabled aircraft and/or personnel, comprising in combination:
speed reduction means selectively operable to stabilize and slow the air speed in the event of an emergency condition;
an inflatable structure having an airfoil cross-section including flight control surfaces and a container therefor stored in a normally deflated condition in said aircraft;
a first pilot parachute attached to said container;
means responsive to flight speed, becoming operable after a predetermined speed reduction of said aircraft to eject said container and said first pilot parachute from said aircraft, said pilot parachute then acting to lift said container above the aircraft away from any obstruction thereon and pulling container off said deflated airfoil;
inflation means integral with said airfoil structure and including means for being rendered operative after said container is removed;
a second pilot parachute attached to said airfoil structure and becoming deployed after said container is removed for orienting said airfoil structure to provide lift substantially immediately during inflation and further aiding proper inflation of the structure so that the centermost section inflates prior to the outermost sections whereby an immediate altitude increase results for providing additional clearance for emergencies occurring near the ground;
a plurality of suspension lines attached to the underside of said airfoil structure and said control surfaces;
a plurality of rotatable reels mounted on said aircraft, being attached to said suspension lines and having controlled braking means, said braking means being adapted to control the unreeling of the suspension lines during deployment to prevent unusually high snatch forces from being exerted on said suspension lines;
respective driver means coupled to said plurality of rotatable reels, being operable thereby to control the angle of attack of said airfoil and selective operation of said control surfaces; and
flight control means coupled to said individual reel driver means to selectively control the angle of attack of said airfoil structure and operate said control surfaces for steering said airfoil structure to a predetermined destination and performing a flareout and landing maneuver thereby.
2. The system as defined by claim 1 wherein said inflatable airfoil structure comprises a wing having a rectangular planform and said control surfaces comprises deflectable flap means arranged along the trailing edge of said wing.
3. The system as defined by claim 2 wherein said plurality of suspension lines include three sets of lines respectively attached to the forward, middle and rear portions of said wing.
4. The system as defined by claim 3 and wherein said flap means comprises three flap members arranged substantially across the entire trailing edge of said wing and wherein said plurality of suspension lines includes at least one individual suspension line attached to each flap member.

5. The system as defined by claim 4 wherein said first and second pilot parachute comprise lifting type parachutes.

6. The system as defined by claim 5 wherein said lifting type parachutes are comprised of parawing parachutes.

7. The system as defined in claim 6 wherein said aircraft speed reduction means comprises a drag parachute located in the rear section of said aircraft and being deployable upon command.

8. The system as defined in claim 7 wherein said inflation means comprises a gas turbine and a rotary air compressor coupled to and driven by said turbine and having a compressed air output conduit coupled to the interior of said wing, said turbine being energized upon command to inflate said wing.

9. The system as defined by claim 8 and additionally including electrical generator means coupled to said turbine for powering said flight control means.

10. The system as defined by claim 8, and wherein said wing additionally includes pressure relief valve means for maintaining the internal pressure of said wing at a predetermined value upon inflation, and wherein said turbine is operable for a predetermined time after inflation to insure continued pressurization of said wing for a time sufficient to land said disabled aircraft at its predetermined location.

11. The system as defined by claim 4 wherein said plurality of rotatable reels are mounted within a housing located on the upper portion of said aircraft in the vicinity of its center of gravity.

12. The system as defined by claim 11 wherein a plurality of said rotatable reels are mounted on respective concentric shafts having a common central axis and wherein said braking means includes pressure plates at either end of said plurality of rotatable reels and wherein said pressure plates and said rotatable reels include braking surfaces which frictionally engage one another upon a compression force being applied to at least one of said plates.

13. The system as defined by claim 11 wherein selected reels of said plurality are located on a common axis of rotation and at least one reel of said plurality is located on another axis rotation substantially parallel to said common axis.

14. The system as defined by claim 1 and additionally including catenary means formed on the underside of the airfoil structure and wherein selected suspension lines of said plurality of suspension lines are connected to said catenary means.

* * * * *